United States Patent [19]
Mathues

[11] 3,938,333
[45] Feb. 17, 1976

[54] MASTER CYLINDER
[75] Inventor: Thomas P. Mathues, Miamisburg, Ohio
[73] Assignee: General Motors Corporation, Detroit, Mich.
[22] Filed: Feb. 10, 1975
[21] Appl. No.: 548,356

[52] U.S. Cl. ................. 60/574; 303/6 C; 200/82 D; 60/534; 60/591
[51] Int. Cl.² .......................................... B60T 11/08
[58] Field of Search ............ 60/534, 535, 545, 550, 60/562, 563, 572, 573, 574, 590–592; 200/82 R; 303/6 C; 188/152, 349

[56] References Cited
UNITED STATES PATENTS

| | | | |
|---|---|---|---|
| 3,097,018 | 7/1963 | Stelzer | 60/574 |
| 3,147,042 | 9/1964 | Stelzer | 60/574 |
| 3,365,243 | 1/1968 | Doerfler | 60/591 |
| 3,421,321 | 1/1969 | Lewis | 60/535 |
| 3,489,465 | 1/1970 | Bueler | 60/574 |
| 3,517,970 | 6/1970 | Cripe | 60/574 |
| 3,686,864 | 8/1972 | Shutt | 60/534 |
| 3,749,451 | 7/1973 | Edsall | 303/6 C |
| 3,852,962 | 12/1974 | Warwick | 60/535 |

*Primary Examiner*—Martin P. Schwadron
*Assistant Examiner*—H. Burks, Sr.
*Attorney, Agent, or Firm*—D. D. McGraw

[57] ABSTRACT

A dual master cylinder has a secondary piston which when actuated pressurizes fluid in two secondary chamber sections with one chamber section increasing pressure at a faster rate than the other as the piston is stroked. The piston has passage means therein interconnecting the two chamber sections, a proportioning valve mechanism in the passage means acting to proportion fluid pressure from the one chamber section to the other chamber section after a predetermined pressure differential exists in the two chamber sections. A shuttle piston also mounted in the secondary piston is responsive to pressure generated in the one secondary chamber section and in the primary pressurizing chamber between the primary and secondary master cylinder pistons. If a pressure loss is suffered in the primary pressurizing chamber during master cylinder actuation, the shuttle piston moves to render the proportioning valve mechanism inoperative and permit substantially unrestricted pressure flow from the one secondary chamber section to the other secondary chamber section and thence to the fluid brake circuit connected thereto. The shuttle piston also has suitable cams which actuate a cam follower arrangement mounted on the secondary piston which in turn actuates a warning switch mechanism when the shuttle piston is moved in either direction because of a pressure loss in one of the two chambers to which it is pressure connected. The primary pressurizing chamber has an outlet in which a metering valve mechanism is provided, the pressurized fluid then passing to another fluid brake circuit. A modified embodiment of the invention uses a proportioner piston between a single secondary pressurizing chamber and an outlet chamber, with one end of the shuttle piston also functioning to define the small diameter portion of the proportioner mechanism.

4 Claims, 5 Drawing Figures

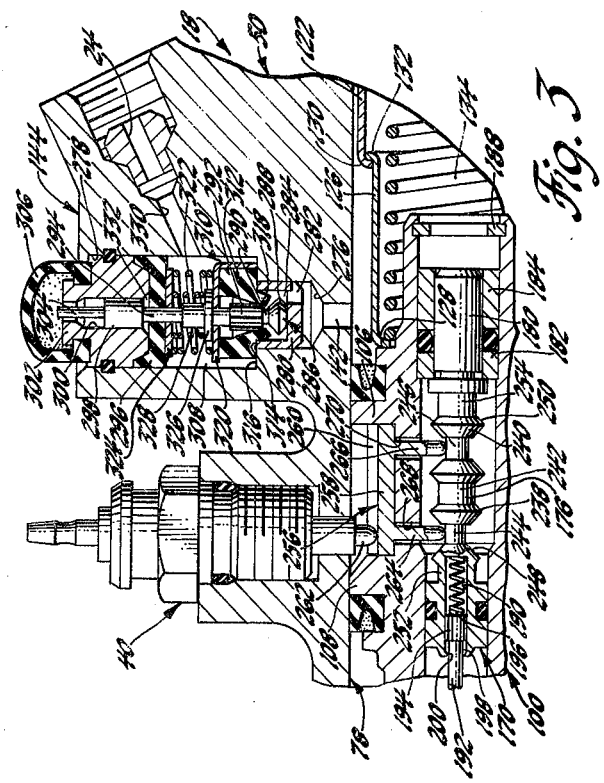

MASTER CYLINDER

The invention relates to a master cylinder assembly and more particularly to one in which a proportioning valve mechanism is provided in the secondary piston of a dual master cylinder. It is a feature of one embodiment of the invention to divide a secondary pressurizing chamber, in which fluid is pressurized by movement of the secondary piston, into two chamber sections with the first chamber section pressurizing the fluid at a higher rate of pressurization than the second chamber section. A brake circuit is connected to an outlet of the second chamber section. Passage means provided in the secondary piston connects the two secondary chamber sections and a proportioning valve mechanism is positioned in the passage means so that it is responsive to the fluid pressures generated in the two secondary chamber sections. When the pressure generated in the first and second secondary chamber sections has increased beyond a predetermined point, the proportioning valve mechanism becomes operative to proportion the pressure between the two chambers. The full available displacement of both chamber sections is utilized by the time the secondary piston reaches its stroke limit, whether or not the proportioning valve mechanism proportions.

It is another feature of the invention to provide a shuttle piston in a bore in the secondary piston, the shuttle piston having one end responsive to pressure generated in a primary pressurizing chamber, positioned between the master cylinder primary piston and secondary piston, and the other end of the shuttle piston responsive to pressure in the first secondary pressurizing chamber section. A portion of the proportioning valve mechanism is mounted on the shuttle piston so that when the shuttle piston moves toward the primary pressurizing chamber due to a loss in pressure in that chamber or the fluid circuit connected to it, relative to pressure in the first secondary pressurizing chamber section, the proportioning valve mechanism is rendered inoperative to proportion, and pressurized fluid generated in the first secondary pressurizing chamber section is transmitted to the fluid circuit connected with the second secondary pressurizing chamber section without being proportionately decreased.

It is a feature of another embodiment of the invention to mount the proportioner piston in the secondary piston fluidly intermediate a single secondary pressurizing chamber and an outlet chamber, with a portion of the shuttle piston also defining the area of the small diameter portion of the proportioner piston.

The proportioning mechanism is closely related to the mechanism disclosed in U.S. Pat. No. 3,733,106, issued May 15, 1973, entitled "Combination Valve Assembly With Proportioner Override" and assigned to the common assignee. That patent discloses a combination valve mechanism including a proportioning section, a pressure failure warning section and a metering section.

IN THE DRAWINGS

FIG. 1 is a schematic representation of a dual circuit brake system for a vehicle utilizing a master cylinder assembly embodying the invention.

FIG. 2 is a cross section view of the master cylinder assembly utilized in the system of FIG. 1, with parts broken away.

FIG. 3 is a fragmentary cross section view of a portion of the master cylinder assembly as taken in the direction of arrows 3—3 of FIG. 1.

Figure 4:
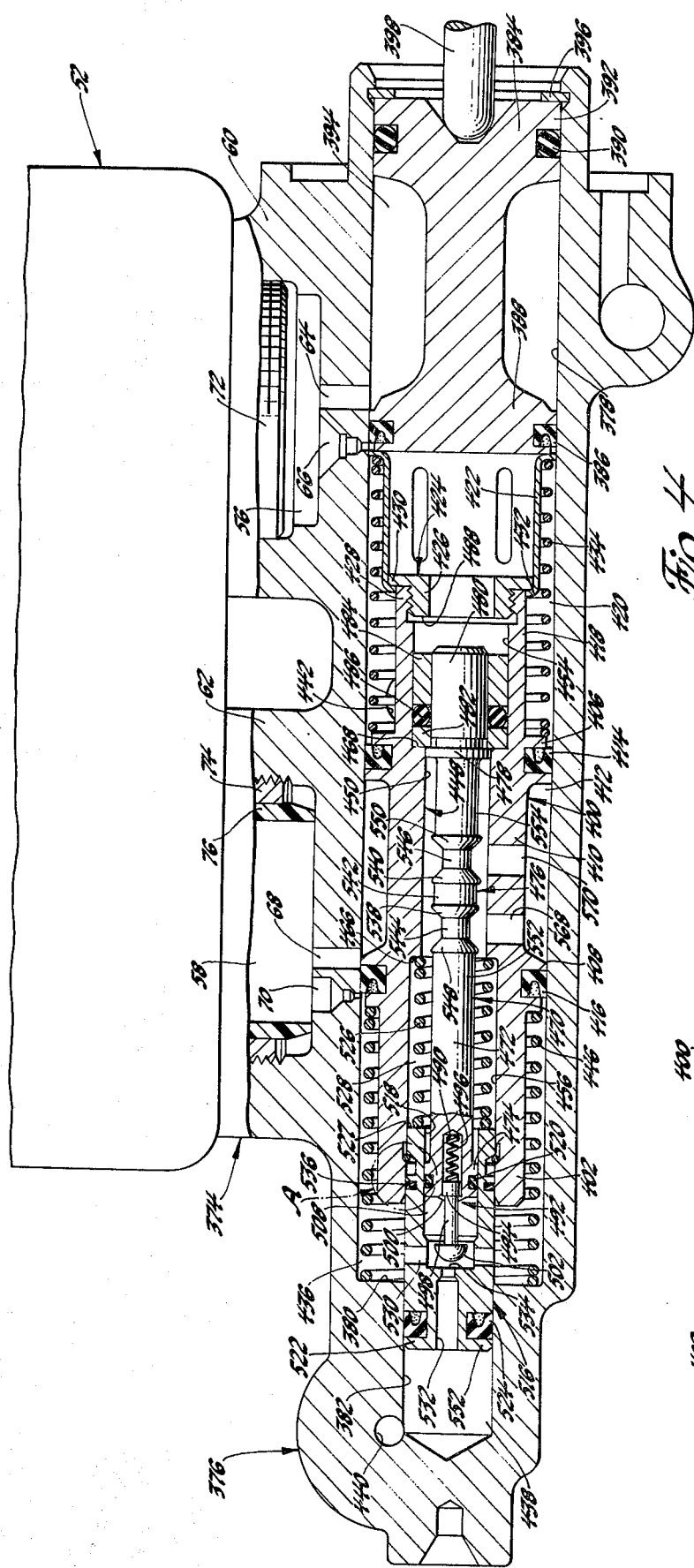

FIG. 4 ia a cross section view similar to FIG. 2 and illustrating another embodiment of the invention.

Figure 5:
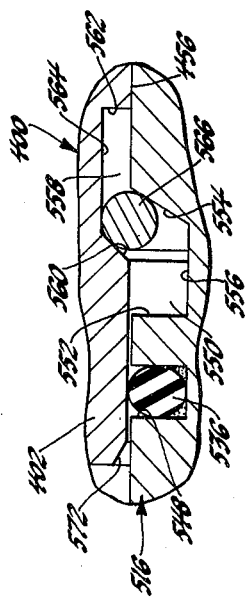

FIG. 5 is an enlarged view of a part of the assembly of FIG. 4 within the circle A.

The system illustrated in FIG. 1 includes a brake pedal 10 suitably mounted on a portion 12 of a vehicle so as to transmit braking effort through the push rod 14 to the brake booster 16. The master cylinder assembly 18 embodying the invention is actuated by the booster 16 in the usual manner. The master cylinder assembly is of the dual pressurizing chamber type arranged to provide brake actuating fluid to two separate brake circuits. The front brake circuit 20 includes a brake line 22 and branches thereof which lead from the master cylinder assembly outlet 24 to the vehicle front wheel brakes 26 and 28. The rear brake circuit 30 includes brake line 32 and branches thereof which connect the master cylinder assembly outlet 34 with the vehicle rear wheel brakes 36 and 38. The master cylinder assembly 18 has a warning switch assembly 40 which is in an electrical circuit schematically illustrated as including an electrical lead 42 containing in series with warning switch assembly 40 a switch 44, a warning signal lamp 46, and a source of electrical energy such as battery 48.

The master cylinder assembly 18 is illustrated in greater detail in FIGS. 2 and 3. The assembly is generally comprised of a master cylinder housing 50 on which a fluid reservoir housing 52 is secured. The reservoir portion of assembly 18 has a primary reservoir chamber 54 formed by housing 52, and first and second secondary reservoir chambers 56 and 58 respectively formed in bosses 60 and 62 on the upper side of the master cylinder housing 50. The bottoms of these secondary reservoir chambers are respectively provided with compensation ports 64 and 66, and 68 and 70. Tubular member 72 is threaded into the first secondary reservoir chamber 56 and acts as a retaining member for reservoir housing 52. Another tubular member 74 is threaded into the second secondary reservoir chamber 58 and also acts as a retainer for reservoir housing 52. An apertured baffle plate 76 is fitted within tubular member 74 to provide a tortuous flow path for fluid from the primary reservoir chamber 54 to compensation ports 68 and 70. The baffle plate also prevents fluid which may squirt through port 70 upon brake release from being propelled directly into the primary reservoir chamber 54. The reservoir construction is disclosed and claimed in greater detail in U.S. Pat. application Ser. Nos. 462,335 and 462,355, now U.S. Pat. Nos. 3,877,228 and 3,886,747 respectively which were filed Apr. 19, 1974, each entitled "Master Cylinder Assembly and Reservoir For Same."

Housing 50 has a main bore 78 therein with the forward end of the main bore having a shoulder 80 leading to the bore reduced diameter section 82. The compensation ports 64 and 66, and 68 and 70, connect the reservoir chambers 56 and 58 with the main bore 78. A primary pressurizing piston 84 is reciprocably received in the rear portion of main bore 78. It is provided with the usual piston cup 86 on the piston forward land 88 and a seal 90 on the piston rear land 92. The two lands 88 and 92, with the reduced diameter portion of the piston joining these lands, cooperate with a portion of main bore portion 78 to define the reservoir connected cavity 94. This cavity is always connected through port 64 fith reservoir chamber 56. A piston stop 96 is provided in the rear end of main bore 78 to locate the piston 84 in its brake release position and to retain it in the bore. The push rod 98 is the output member of the booster 16. The rod is suitably positioned in a socket formed in the rear wall of piston 84 so that the piston may be moved leftwardly as seen in FIG. 2 when the master cylinder assembly is being actuated.

A secondary pressurizing piston 100 is also reciprocably received in main bore 78 and has a reduced diameter forward extension 102 which extends into the main bore reduced diameter section 82. A seal 104 on extension 102 slidably seals the piston relative to bore section 82. The piston also has axially spaced lands 106 and 108 joined by a reduced diameter section 110 so as to define with main bore 78 another reservoir connected cavity 112. This cavity is always connected with reservoir chamber 58 through port 68. V-block seals 114 and 116 are respectively provided on lands 106 and 108 to seal against any fluid pressure flow past these lands from other portions of the main bore into cavity 112. The secondary piston also has a reduced diameter rearward extension 118. Extension 118 is located in the primary pressurizing chamber 120 which is defined by the main bore 78 and the primary and secondary pistons 84 and 100. A caging mechanism providing a piston location and return spring arrangement includes one annular spring retainer section 122 secured to the forward end of primary piston 84 by the bolt 124 and a second spring retainer section 126 fitting against the secondary piston shoulder 128, which is a part of land 106, and interlocked with retainer 122 by the retainer flanges 130 and 132 so as to limit the extensible length of the retainer sections while permitting them to telescope. Spring 134 is a compression spring having one end acting on retainer section 122 and the other end acting on retainer section 126 so as to be caged between them. When the master cylinder assembly is in the brake release position illustrated, the compressive force stored in spring 134 extends the retainer sections 122 and 126 as shown in FIG. 2 to establish a precise location for the secondary piston 100.

The secondary piston land 108 cooperates with the main bore 78 and shoulder 80 to define a first section 136 of the secondary pressurizing chamber means. Chamber section 136 is annular, being formed about secondary piston extension 102. When the master cylinder assembly is in the brake release position illustrated, compensation port 70 is adjacent but clear of seal 116. As is well known in the art, slight brake actuating movement of secondary piston 100 will cause seal 116 to close the compensation port so that fluid may be pressurized in chamber section 136. The second section 138 of the secondary pressurizing chamber means is defined by bore reduced diameter section 82 and the extension 102 of secondary piston 100. An outlet passage 140 leads to outlet 34 to which the rear brake circuit 30 is connected. Passage 140 is fluid connected with chamber 138.

Compensation port 66 is also positioned immediately adjacent but clear of seal 86 when the assembly is in the brake release position, and is closed by slight brake actuating movement of primary piston 84 so that fluid may be pressurized in the primary pressurizing chamber 120. Outlet passage 142 is fluid connected with primary pressurizing chamber 120 slightly rearwardly of the brake release position of secondary piston seal 114. Passage 142 is operatively connected through the metering valve section 144 of assembly 18 to the outlet 24. Thus fluid in the primary pressurizing chamber 120 is pressurized to actuate the vehicle front brakes 26 and 28, and fluid pressurized in sections 136 and 138 of the secondary reservoir chamber means actuates the rear brakes 36 and 38. Upon brake release the secondary piston return spring 146, located in chamber 136 and having one end acting on shoulder 80 and the other end acting on secondary piston land 108, urges the secondary piston rearwardly. It also acts through return spring 134 and joins with the expanding action of that spring to urge primary piston 84 rearwardly. This permits all of the pressurizing chambers to expand and return to the brake release position shown in the drawing.

A bore 148 is formed through secondary piston 100, with a wall 150 being provided in the bore and having an aperture 152 therethrough. The wall 150 divides bore 148 into a first bore section 154 and a second bore section 156. A passage 158 in the secondary piston provides fluid communication between chamber 136 and bore section 154 immediately adjacent wall 150. The bore section 154 has stepped diameters with the smallest diameter portion 160 being adjacent wall 150, the largest diameter portion 162 being at the other end of bore section 154 and opening into chamber 120, and the intermediate diameter portion 164 being positioned axially between diameter portions 160 and 162 and respectively connected therewith at shoulders 166 and 168.

A shuttlepiston assembly 170 is positioned in bore section 154 for reciprocal movement in either direction from the center position illustrated in the drawing. The piston assembly 170 includes a piston body 172 having a land 174 at one end, a camming section 176 of reduced diameters relative to the diameter of land 174, a flange 178, and a piston end 180 of smaller diameter than the diameter of flange 178. The shuttle piston assembly 170 also includes a pair of sleeves or collars 182 and 184 which are slidably positioned over piston end 180. Sleeve 182 abuts flange 178 and is separated from sleeve 184 by a seal 186 which seals against the wall of the portion 162 of bore section 154 having the largest diameter as well as the cylindrical surface of piston end 180. Sleeve 184 is axially aligned for movement-limiting engagement with a stop 188 positioned in the opening of bore 148 into primary pressurizing chamber 120.

The end of piston body 172 adjacent land 174 is provided with a recess 190 opening into the portion 160 of bore section 154 having the smallest diameter and axially intermediate land 174 and wall 150. A proportioner stem 192 has a fluted end 194 reciprocably received in recess 190 and engaging a light spring 196 within the recess. The portion of the recess containing spring 196 is pressure relieved by the fluted construction of stem end 194. The stem body 198 is of a slightly reduced diameter relative to fluted end 194 so that the piston recess opening is staked at 200 to prevent removal of the proportioner stem while permitting a lost motion or telescoping movement of the stem relative to piston body 172.

The proportioner stem 192 has a valve end 202 extending through aperture 152 of wall 150 with sufficient clearance to permit fluid flow and pressure transmittal therethrough in a substantially unrestricted manner. The proportioner stem may have a flange 204 formed on the center portion of the stem body and positioned in the chamber 206 formed by the piston body 172, wall 150, and the smallest diameter portion of bore section 154. If this flange is used, the side facing wall 150 is fluted so as not to restrict fluid flow through aperture 152 even when the flange abuts the wall. The proportioner stem valve end 202 extends into a chamber 208 on the other side of wall 150 from chamber 206. This chamber is provided in an end of second bore section 156 having a reduced diameter 210. A shoulder 212 separates the reduced diameter portion of second bore section 156 from the larger diameter portion opening into chamber 138 and having a larger diameter 214.

A proportioner piston 216 is reciprocably received in the second bore section 156 of secondary pressurizing piston 100 and has a smaller diameter end land 218 provided with a seal 220 which seals the land relative to the smaller diameter portion of bore section 156. A larger diameter land 222 is provided with a seal 224 and fits in reciprocable sealing relation with the larger diameter portion of bore section 156. A proportioner spring 226 is compressed between land 222 and shoulder 212 in the annular spring cavity 228. The left end of land 222 is in abuttable relation with a stop 230 provided in the outer end of second bore section 156. A through passage 232 is axially formed in piston 216 to provide fluid communication between chambers 208 and 138. The end of passage 232 opening into chamber 208 provides a valve seat 234 which cooperates with valve end 202 for fluid pressure proportioning action to be described. In the brake release position illustrated, proportioner piston 216 abuts stop 230 and there is sufficient clearance between the valve end 202 and the valve seat 234 to permit substantially unrestricted flow between chamber 208 and chamber 138 through passage 232. A secondary piston passage 236 provides continuous fluid communication between spring cavity 228 and the reservoir connected cavity 112.

As is better shown in FIG. 3, the piston camming section 176 of piston body 172 includes annular ridge-like cams 238 and 240 separated by a body section 242 having a first diameter smaller than the cams but larger than the body sections 244 and 246 on the opposite sides of the cams 238 and 240. Additional ridge-like cams 248 and 250 are spaced from the first mentioned cams by sections 244 and 246. On the other sides of cams 248 and 250 are additional body sections 252 and 254 which are of the same diameter as body section 242. A switch control bar 256 is provided in the recessed portion of secondary piston 100 between lands 106 and 108. Bar 256 has a body portion 258 provided with a channel 260 slidably receiving the plunger 262 of switch assembly 40. Bar legs 264 and 266 extend through passages 268 and 270 formed in the body of secondary piston 100 and into the bore section 154.

When the shuttle piston assembly 170 is in the central position shown in the drawing, the free ends of legs 264 and 266 ride on shuttle piston body sections 244 and 246 so that the bar body portion 258 is positioned radially inward of cavity 112 against the body of the secondary piston 100. If the shuttle piston is moved in either direction, for example rightwardly as seen in FIG. 3, legs 264 and 266, acting as cam followers, are forced up over cams 248 and 240 respectively, and engage the larger diameter body sections 252 and 242, respectively. This moves the bar body portion 258 radially outward in cavity 112, moving switch plunger 262 against its spring bias and closing the switch in switch assembly 40 to energize the warning lamp 46, assuming that switch 44, which may be the ignition switch, is closed. This movement would result from a pressure loss in primary pressurizing chamber 120 relative to the secondary pressurizing chamber pressure in chamber 206, which is the same pressure as that in chamber 136. This rightward movement of piston body 172 will cause the proportioner stem 192 to move rightwardly and therefore move valve end 202 sufficiently far away from valve seat 234 so that no proportioning action can take place under influence of pressures acting on the proportioner piston 216. This then opens substantially unrestricted fluid communication between chambers 136 and 138.

When the cause of the pressure loss is determined and repaired, actuation of the system will cause pressure generated in chamber 120 to act across the end of sleeve 184 as well as the piston end 180, generating a greater force leftwardly on the piston body 172 than that generated by the pressure in chamber 206 acting on the smaller effective area of piston land 174. The piston assembly 170 is therefore returned to the center position illustrated, with sleeve 182 abutting shoulder 168. Since the piston end 180 has a smaller effective area than piston land 174, no additional movement leftward occurs so long as the pressures in chambers 120 and 206 are substantially the same.

Pressure loss in chamber 206 during brake actuation will result in the pressure in primary pressurizing chamber 120 acting on piston end 180 to move the shuttle piston body 172 leftwardly, and cams 238 and 250 then lift bar 256 radially outward, the legs 264 and 266 resting on the larger diameter body portions 242 and 254. Switch assembly 40 is then again actuated. The lost motion connection of proportioner stem 192 and piston body 172 permits this movement without moving the proportioner stem. Spring 196 merely collapses. When the cause of the pressure loss has been determined and repaired, the piston body 172 will be returned to the center position illustrated by the differential force acting thereon created by pressure in chamber 206 acting on the larger area of land 174 as compared to the smaller area of piston end 180 on which pressure in chamber 120 acts.

The metering valve section is illustrated in FIG. 3. The primary pressure generated in chamber 120 and destined for the front brakes 26 and 28 enters chamber 276, which is formed in a portion of the metering valve assembly bore 278. This bore is formed in a part of the housing 50. One wall of chamber 276 is defined by the valve pin stop 280. This stop is cup shaped, and is provided with one or more openings 282 through which chamber 276 is connected to chamber 284 inside the cup. The metering valve pin 286 has a head 288 positioned in chamber 284 and separated by a groove 290 from a knurled pin section 292. This pin further extends to a reduced pin section 294 about which a diaphragm seal 296 is mounted. The pin land 298 is slidably mounted in a bore 300 formed through the valve plug 302. The pin reduced end 304 extends outwardly through the valve plug and is covered by the metering valve boot 306.

The chamber 308 between diaphragm seal 296 and the valve pin stop 280 contains the metering valve 310. The outer portion 312 of valve 310 acts as a valve which sealingly engages a valve seat 314 formed by the valve pin stop 280 and a shoulder 316 of bore 300. The annular portion of metering valve 310 has an axially extending annular section or lip 318 which, in the position shown, receives and engages the outer periphery of the pin knurled section 292. A valve retainer and spring seat 320 presses against the other side of the metering valve 310 relative to valve pin stop 280 and is engaged by compression spring 322, which also acts against spring seat 324 and diaphragm seal 296. The portion of metering valve pin 286 intermediate the knurled section 292 and the reduced pin section 294 has a flange 326 providing a spring seat. Another compression spring 328 seats against spring seats 320 and 326 and urges pin 286 in a direction toward engagement by the end of pin head 288 with pin stop 280. The fluid pressure from chamber 308 passes through outlet passage 330 to the outlet 24 to which the front brake circuit 30 is connected.

When the brake pressure is initially generated in primary pressurizing chamber 120 the pressurized fluid passes through outlet 142, chamber 276, openings 282, chamber 284, and the axial groove openings formed by the knurled pin section 292, to chamber 308. The initial pressure may be in the range between 0 and 30 p.s.i. This light initial pressure in chamber 308 is transmitted through outlet 330 to outlet 24 and then through conduit 22 to the front brakes 26 and 28. It also acts on diaphragm seal 296 to move the metering valve pin 286 upwardly as seen in FIG. 3 against the force of spring 328 until the shoulder of the knurled pin section 292 engages spring seat 320. This provides a first stop for the metering valve pin 286, at which time the smooth outer periphery of the pin head 288 is moved to engage the lip 318 of the metering valve 310, blocking off further flow of fluid from chamber 284 to chamber 308.

Additional inlet pressure must now be built up before additional pressure can be supplied through the valve assembly to the front brakes. This pressure is referred to as the "hold-off" pressure and is controlled by the effective area of the metering valve 210 and the load of spring 322. The hold-off pressure may be varied from about 60 p.s.i. to 200 p.s.i., for example, as may be required for a particular vehicle. This is important to a vehicle having front disc brakes and rear drum brakes. The hold-off pressure permits the drum brake shoes to be expanded against their retracting springs into engagement with the drums before additional pressure is exerted at the front brakes.

Continued increase in inlet pressure in chambers 276 and 284 acts on the effective area of the metering valve 310 and the head 288 of the metering valve pin 286 and eventually causes the pin 286, the valve 310, and the spring retainer 320 to move toward the diaphragm seal 296 against the forces of springs 322 and 328 to open the valve 310 relative to its seat 314. Inlet pressure is then admitted to chamber 308 past the outer periphery of valve 310 and acts on the diaphragm seal 296, and particularly the central portion thereof which overlies an enlarged recess 332 at the end of bore 300, to move metering valve pin 286, with retainer 320 and metering valve 310, further upwardly as seen in FIG. 3 until the pin land engages the shouldered end of bore 300 through which the pin reduced end 304 extends. The transition between the inlet pressure in chamber 276 and the outlet 330 takes place as this action occurs. This transition is completed at a pressure point referred to as the "blend" pressure. The inlet pressure in chamber 276 is thereafter the same as the pressure passing through outlet 330 to the front brakes. The blend pressure is controlled by the effective area of diaphragm seal 296 overlying the recess 332 and the spring load of springs 322 and 328.

Upon release of pressure in chamber 120, metering valve pin 286 gradually moves toward pin stop 280 as do the metering valve 310 and the retainer 320, until the metering valve 310 again has its outer periphery 312 seating against its valve seat 314. As further release of inlet pressure occurs, the lip 318 of the metering valve lifts to allow fluid to flow from chamber 308 to chamber 276. This allows release of pressure at the front brakes with a very small pressure differential. Upon complete release the metering valve pin 286 assumes the position shown so that chamber 308 is again in fluid communication with chamber 284 through the grooves formed by the knurls of knurled pin section 292. These grooves provide free flow of brake fluid for compensation of changes in volume of the hydraulic circuit 20 due to thermal changes.

During normal brake operation push rod 98 is moved leftwardly to move primary piston 84 leftwardly to pressurize brake fluid in primary pressurizing chamber 120. Some of the force exerted by push rod 98 is transmitted to the secondary piston 100 through spring 134. However, the major portion of the force is transmitted through the fluid in chamber 120. These forces move secondary piston 100 leftwardly as seen in FIG. 2 against the force of spring 146 and fluid is pressurized in chambers 136 and 138. At a predetermined force differential, the forces acting on proportioner piston 216 due to the differential areas exposed to chambers 136 and 138 will cause the piston to move rightwardly against the force of spring 226, causing a proportioning action to take place between valve end 202 and valve seat 234. Thus the pressure from chamber 136 is proportioned into chamber 138 at a predetermined ratio once proportioning action begins and the net result is that proportionately less pressure is delivered to the rear brakes 36 and 38 than to the front brakes 26 and 28. The effective areas of the secondary piston forming the movable walls of these chambers are so proportioned that fluid is pressurized at a higher rate in chamber 136 than in chamber 138 for a given leftward stroke of secondary piston 100 during proportioning action. It can be readily seen that with this arrangement the full available volume displacements of chambers 136 and 138 are utilized, as is the full available volume displacement of chamber 120.

In order to obtain proportioned fluid pressure at the outlet 140 the secondary piston 100 must be put into equilibrium with part of its area being acted on by proportioned pressure. Three pressures act on five different areas. The areas are indicated in the drawing as diameters, it being understood that when reference is made to such an area it refers to the area which is indicated by the diameter concerned. The area of the master cylinder bore 78 is indicated by diameter 272. A second area of concern is that of the proportioner valve seat 234. The third area is the minor diameter of the proportioner indicated by diameter 210. A fourth area of concern is represented by the major diameter 214 of the proportioner. The fifth area is represented by the diameter 274 of bore section 82. When the outlet pressure in passage 140 is sufficiently great to begin proportioning operation, the secondary piston 100 is balanced by forces generated by pressure in primary pressurizing chamber 120 acting across the first area having diameter 272, and by the pressure generated by secondary piston 100 in chambers 136 and 138 also acting across the area having diameter 272. When the pressure in chamber 138 generates a force acting on the fourth area, represented by diameter 214, which exceeds the force generated by the pressure in chamber 208 acting against the area represented by diameter 210, plus the spring load of proportioner spring 226, the proportioner begins its proportioning action. After proportioning begins the pressure acting across the area represented by diameter 274 is lower than the pressure generated by the primary pressurizing piston in chamber 120. This requires that the pressure generated in the secondary piston pressurizing chamber 136 be higher to keep the secondary piston in equilibrium. The proportioner areas represented by diameters 210 and 214 are calculated to provide a desirable slope of proportioner pressure increase using the higher pressure in chamber 136 as the upstream pressure. The pressure slope obtained at the rear brakes 36 and 38 is calculated by dividing the outlet pressure delivered to the front brakes by the outlet pressure delivered to the rear brakes.

A modified master cylinder assembly 374 is illustrated in greater detail in FIGS. 4 and 5. The reservoir portion of the assembly is generally similar to that of assembly 18 and its components have the same reference numbers identifying equivalent parts.

Housing 376 of assembly 374 has a main bore 378 therein with the forward end of the main bore having a shoulder 380 leading to the bore reduced diameter section 382. The compensation ports 64 and 66, and 68 and 70, connect the reservoir chambers 56 and 58 with the main bore 378. A primary pressurizing piston 384 is reciprocably received in the rear portion of main bore 378. It is provided with the usual piston cup 386 on the piston forward land 388 and a seal 390 on the piston rear land 392. The two lands 388 and 392, with the reduced diameter portion of the piston joining these lands, cooperate with a portion of main bore portion 378 to define the reservoir connected cavity 394. This cavity is always connected through port 64 with reservoir chamber 56. A piston stop 396 is provided in the rear end of main bore 378 to locate the piston 384 in its brake release position and to retain it in the bore. The push rod 398 is the output member of the booster 16. The rod is suitably positioned in a socket formed in the rear wall of piston 384 so that the piston may be moved leftwardly as seen in FIG. 4 when the master cylinder assembly is being actuated.

A secondary pressurizing piston 400 is also reciprocably received in main bore 378 and has a reduced diameter forward extension 402 which extends toward shoulder 380. This piston also has axially spaced lands 406 and 408 joined by a reduced diameter section 410 so as to define with main bore 378 another reservoir connected cavity 412. This cavity is always connected with reservoir chamber 58 through port 68. V-block seals 414 and 416 are respectively provided on lands 406 and 408 to seal against any fluid pressure flow past these lands from other portions of the main bore into cavity 412. The secondary piston also has a reduced diameter rearward extension 418. Extension 418 is located in the primary pressurizing chamber 420 which is defined by the main bore 378 and the primary and secondary pistons 384 and 400. A caging mechanism providing a piston location and return spring arrangement includes one annular spring retainer section 422 fitting against the forward end of primary piston 384 and a second annular spring retainer section 424 having a threaded body section 426 threaded into the end 428 of the secondary piston extension 418. Retainer 424 is interlocked with retainer 422 by the retainer flanges 430 and 432 so as to limit the extensible length of the retainer sections while permitting them to telescope. Spring 434 is a compression spring having one end acting on retainer section 422 adjacent primary piston land 388 and the other end acting on land 406 so as to be caged between them. When the master cylinder assembly is in the brake release position illustrated, the compressive force stored in spring 434 extends the retainer section 422 relative to section 426 as shown in FIG. 4 to establish a precise location for the secondary piston 400.

The secondary piston land 408 cooperates with the main bore 378 and shoulder 380 to define a first section 436 of the secondary pressurizing chamber means. Chamber section 436 is generally annular, being formed about secondary piston extension 402. When the master cylinder assembly is in the brake release position illustrated, compensation port 70 is adjacent but clear of seal 416. As is well known in the art, slight brake actuating movement of secondary piston 400 will cause seal 416 to close the compensation port so that fluid may be pressurized in chamber section 436. The second section 438 of the secondary pressurizing chamber means is an outlet chamber defined by bore reduced diameter section 382 and the larger area end of proportioner piston 516 described below. An outlet passage 440 leads to outlet 34 to which the rear brake circuit 30 is connected. Passage 440 is fluid connected with chamber 438.

Compensation port 66 is positioned immediately adjacent but clear of seal 386 when the assembly is in the brake release position, and is closed by slight brake actuating movement of primary piston 384 so that fluid may be pressurized in the primary pressurizing chamber 420. Outlet passage 442 is fluid connected with primary pressurizing chamber 420 slightly rearwardly of the brake release position of secondary piston land 406. Passage 442 is operatively connected to the vehicle front brake circuit through outlet 24. Thus fluid in the primary pressurizing chamber 420 is pressurized to actuate the vehicle front brakes 26 and 28, and fluid pressurized in sections 436 and 438 of the secondary reservoir chamber means actuates the rear brakes 36 and 38. Upon brake release the secondary piston return spring 446, located in chamber 436 and having one end acting on shoulder 380 and the other end acting on secondary piston land 408, urges the secondary piston rearwardly. It also acts through return spring 434 and joins with the expanding action of that spring to urge primary piston 384 rearwardly. This permits all of the pressurizing chambers to expand and return to the brake release position shown in the drawing.

A bore 448 is formed through secondary piston 400, and has a center section 450, a first end bore section 454 and a second end bore section 456. Sections 454 and 456 are somewhat larger in diameter than center section 450. The bore section 454 has retainer section 424 threaded into its end 428, which opens into chamber 420. The center bore portion 450 is positioned axially between sections 454 and 456 and is respectively connected therewith at shoulders 466 and 468.

A shuttle piston assembly 470 is positioned in bore 448 for reciprocal movement in either direction from the center position illustrated in the drawing. The piston assembly 470 includes a piston body 472 having a land 474 at one end, a camming section 476 of reduced diameters relative to the diameter of land 474, a flange 478, and a piston end 480 of smaller diameter than the diameter of flange 478. The shuttle piston assembly 470 also includes a pair of sleeves or collars 482 and 484 which are slidably positioned over piston end 480. Sleeve 484 abuts flange 478 and is separated from sleeve 484 by a seal 486 which seals against the wall of the portion 454 of bore 448 and the cylindrical surface of piston end 480. Sleeve 484 is axially aligned for movement-limiting engagement with the end 488 of retainer section 424.

The end of piston body 472 adjacent land 474 is provided with a recess 490. A proportioner stem 492 has a fluted end 494 reciprocably received in recess 490 and engaging a light spring 496 within the recess. The portion of the recess containing spring 496 is pressure relieved by the fluted construction of stem end 494. The stem body 498 is of a slightly reduced diameter relative to fluted end 494 so that the piston recess opening is staked at 500 to prevent removal of the proportioner stem while permitting a lost motion or telescoping movement of the stem relative to piston body 472.

The proportioner stem 492 has a valve end 502 which extends into a chamber 508 formed in a proportioner piston 516. Proportioner piston 516 is reciprocably received in the bore section 456 of secondary pressurizing piston 400 and also in bore section 382 of main bore 378. Piston 516 has a recess 518 in which land 474 is reciprocably received so that chamber 508 is a part of recess 518. A seal 520 seals between land 474 and recess 518. The end 522 of piston 516 is provided with a seal 524 and fits in reciprocable sealing relation with the bore section 382. A proportioner spring 526 is compressed between proportioner piston end 527 and shoulder 466 in the annular spring cavity 528 formed by bore portion 456 about a part of piston body 472. A cross passage 530 is provided in the center part of piston 516 to provide fluid communication between chambers 436 and 508. A through passage 532 is axially formed in piston 516 to communicate with recess 518 and to provide fluid communication between chambers 508 and 438. The end of passage 532 opening into chamber 508 provides a valve seat 534 which cooperates with valve end 502 for fluid pressure proportioning action to be described. In the brake release position illustrated, proportioner piston 516 is held in place by the stop arrangement described below so that there is sufficient clearance between the valve end 502 and the valve seat 534 to permit substantially unrestricted flow between chamber 508 and chamber 438 through passage 532. A seal 536 in an annular recess formed in the outer periphery of piston 516 seals that piston relative to bore 456 of piston 400.

The piston camming section 476 of piston body 472 includes annular ridge-like cams 538 and 540 separated by a body section 542 having a first diameter smaller than the cams but larger than the body sections 544 and 546 on the opposite sides of the cams 538 and 540. Additional ridge-like cams 548 and 550 are spaced from the first mentioned cams by sections 544 and 546. On the other sides of cams 548 and 550 are additional body sections 552 and 554 which are of the same diameter as body section 542. A switch control bar like that of bar 256 is provided in the recessed portion of secondary piston 400 between lands 406 and 408. Passages 568 and 570, formed in the body of secondary piston 500, are illustrated with a 90° displacement to show that they open into chamber 412. They function as do passages 268 and 270 for the switch actuating mechanism. Switch action of switch assembly 40 is the same as described above with regard to FIGS. 2 and 3.

An enlarged view of the stop mechanism for proportioner piston 516 is shown in FIG. 5. Piston 516 has a groove 548 formed in the periphery of the portion which remains within bore 456, and seal 536 is received therein. Another groove 550 is formed adjacent groove 548 and toward piston end 527. This groove has a straight side 552 and a beveled side 554. Side 554 is beveled at about 30° from the diametrical direction, so that the open top of the groove is wider than the groove bottom 556. Another groove 558 is formed as an internal groove in bore 456 and is generally aligned radially with groove 550. Groove 558 has a beveled side 560 and a straight side 562. Side 560 is beveled at about 45° from the diametrical direction, and is similarly wider at the open top than the groove bottom 564. A snap ring 566 is received in the grooves 550 and 558. These grooves are wider than the wire diameter of ring 566, with groove 550 having a depth slightly greater than the ring wire diameter. Groove 558 has a depth equal to about half the ring wire diameter. Ring 556 extends circumferentially a slightly lesser distance than the circumference of groove bottom 556 so that it can be fitted in groove 550 against its expanding preload. The end of bore 456 is beveled at 572 so that when piston 516 is inserted into the bore the ring will be cammed into groove 550. When the ring is in radial alignment with groove 558, it expands so that its radially outer portion is in groove 558 and its radially inner portion is in groove 550. Under the force of spring 526, the ring engages groove sides 554 and 560 and positions the piston 516 relative to shuttle piston assembly 470 and secondary piston 400. When piston 416 moves rightwardly relative to piston 400, the axial movement is limited to that permitted by the radially extending groove sides 552 and 562. Removal of piston 516 can be accomplished by providing a force on that piston acting as does spring 526, but much greater than the spring force, until ring 566 is cammed by beveled groove side 560 into groove 550.

Shuttle piston 472 will be moved rightwardly, as seen in FIG. 4, when a pressure loss occurs in chamber 420 relative to the pressure in interconnected chambers 436, 438 and 508. This movement will actuate the warning circuit, as earlier described, and will remove valve end 502 of the proportioner stem 492 sufficiently far from valve seat 534 so that no proportioning action can take place. Instead, substantially unrestricted fluid communication is opened between chambers 436 and 438. The shuttle piston is recentered after the cause of the pressure loss has been eliminated and upon brake actuation, in a manner similar to that described above with regard to FIGS. 2 and 3.

A pressure loss in chamber 438 is transmitted to chambers 508 and 436 through the proportioning valve and cross passage 530, allowing the secondary piston to move leftwardly until the end of extension 402 engages shoulder 380. Sufficient pressure differential then is generated across shuttle piston assembly 470 to move it leftwardly, actuating the warning circuit and also causing valve end 502 to close valve seat 534. Assembly 470 remains in this position, preventing any additional fluid from being pumped through valve passage 532 upon later brake actuation until the circuit connected to chamber 438 is restored to its proper condition. When this is done, brake actuation will cause assembly 470 to be recentered in the manner similar to that described above with regard to FIGS. 2 and 3.

During normal brake operation push rod 398 is moved leftwardly to move primary piston 384 leftwardly to pressurize brake fluid in primary pressurizing chamber 420. Some of the force exerted by push rod 398 is transmitted to the secondary piston 400 through spring 434. However, the major portion of the force is transmitted through the fluid in chamber 420. These forces move secondary piston 400 leftwardly as seen in FIG. 4 against the force of spring 446 and fluid is pressurized in chambers 436, 508 and 438. At a predetermined pressure, the forces acting on proportioner piston 516 due to the differential areas exposed to chambers 436 and 508 will cause the piston 516 to move rightwardly against the force of spring 526, causing a proportioning action to take place between valve end 502 and valve seat 534. Thus the pressure from chamber 436 is proportioned into chamber 438 at a predetermined ratio once proportioning action begins and the net result is that proportionately less pressure is delivered to the rear brakes 36 and 38 than to the front brakes 26 and 28. It can be readily seen that with this arrangement the full available volume displacement of chambers 436 and 438 are utilized, as is the full available volume displacement of chamber 420.

When the proportioner piston 516 is at rest it is urged away from the shoulder 466 of secondary piston 400 by proportioner spring 526. It is limited in this movement by the action of snap ring 566 as described above. The passageway between the valve end 502 and its seat 534 is normally open. When the master cylinder is actuated, brake fluid is displaced from chambers 420 and 436 under pressure. The fluid in chamber 420 is displaced through outlet 442. Fluid is transferred from chamber 436 through chamber 508, passage 532, and chamber 438 to outlet 440. The pressure in chamber 436 is the same as the pressure in chamber 508. Until the brake pressure has built up sufficiently in chamber 438 to cause proportioning action to begin, the pressure is the same in chambers 436, 508 and 438. This pressure acts on the effective annular area defined by the difference in areas of recess 518 and the second bore end section 456 of bore 448. This generates a force urging the proportioner piston 516 rightwardly relative to the secondary piston 400 against the force of proportioner spring 526. When sufficient force has been built up to overcome spring 526, proportioner piston 516 moves slightly rightwardly, closing valve seat 534 against valve end 502. Proportioning begins at this point. The internal proportioning rate is determined by the pressure balance of the proportioner piston and is the ratio of pressure in chambers 436 and 508 relative to pressure in chamber 438. The pressure in chamber 438 acts on the annular area of piston 516 within the bore reduced diameter section 382 minus the area of valve seat 534. The pressure in chamber 436 and 508 acts on the annular area defined by the area of recess 518 minus the area of the valve seat 534. Since this annular area is smaller than the area acted on by pressure in chamber 438, the pressure in chambers 436 and 508 must be higher than that in chamber 438 to balance the proportioner piston 516. This relationship is based on the premise that the areas of bore section 382 and 456 are equal. If they are not equal, the force determined by the annular area of bore section 456 minus the area of bore section 382, multiplied by the pressure in chamber 436, must be added to the force produced by the pressure in chamber 438 acting on its respective area. If bore section 382 is larger than bore section 456, this analysis still applies using arithmetical sign convention. The overall proportioner ratio can be calculated by dividing the pressure produced in chamber 438 by the pressure produced in chamber 420.

The shuttlepiston 520 serves two functions in this embodiment. It serves the normal shuttle piston function in separating chamber 508 from the pressure in chamber 412, and also serves as the small diameter proportioner seal.

As the pressure differential chambers 508 and 438 increases, the differential acts across the proportioning stem 492 to produce a force transferred to the shuttle piston 472, urging that piston leftwardly. This force is counteracted by force generated by the pressure in chamber 508 acting on piston 472. The pressure in chamber 508 is proportionately higher than the pressure in chamber 420 and therefore the shuttle piston remains balanced. The switch assembly 40 has its plunger sufficiently spring loaded so that the caming effect of the cams of the shuttle piston requires sufficient pressure differential acting across the shuttle piston to generate about 70 pounds of force before the shuttle piston moves to actuate the warning switch. This prevents energization of the warning circuit due to minor pressure changes and tolerances in the system such as spring forces and friction loading.

When the master cylinder is released, the pressure-area combination in chamber 438 acting on piston 516 unbalances the piston so that it moves rightwardly relative to piston 400. This movement is limited by the engagement of groove walls 522 and 562 with snap ring 566. The proportioner piston remains in this position until the pressure in chamber 508 becomes less than the pressure in chamber 438, at which time the valve end 502 will be unseated from seat 534 and the proportioner piston will return to its rest position.

The arrangements herein disclosed and claimed are compact, with the proportioner and the shuttle piston being included in the master cylinder assembly with little change in weight or size. The secondary piston assembly can be preassembled with the proportioner and shuttle piston in it to provide a modular unit which can be pretested for switch actuating function, proportioner function, and sealability before it is installed in a master cylinder assembly. The arrangements provide better serviceability since the proportioner, shuttle piston, or the secondary piston itself can be serviced by replacing the secondary piston assembly with a pretested module. Since the proportioner and shuttle piston are vented internally and there are no external connections from the master cylinder to a separate combination valve body, external leak points are decreased. The arrangements also permit the use of common seals and bodies so that several pieces can be eliminated as compared to the use of a separate combination valve assembly.

What is claimed is:

1. A master cylinder assembly comprising:
   a housing having reservoir chamber means and a fluid pressurization bore communicating with said reservoir chamber means, said bore having an open end and a closed end;

fluid pressurizing means reciprocably received in said bore and including a primary piston assembly and a secondary piston assembly in tandem relation, said assemblies each including a pressurizing piston and defining in said bore a primary fluid pressurizing chamber between said pressurizing pistons and a secondary pressurizing chamber on the opposite side of said secondary pressurizing piston from said primary fluid pressurizing chamber and toward said bore closed end, each of said fluid pressurizing chambers having an outlet for delivering pressurized fluid to brakes to be actuated, said secondary pressurizing piston having a bore extending axially therethrough;

a fluid pressure proportioner assembly mounted in said last named bore fluidly intermediate said secondary fluid pressurizing chamber and its outlet and responsive to fluid pressure generated in said secondary fluid pressurizing chamber and fluid pressure at said secondary fluid pressurizing chamber outlet to proportion fluid pressure at a predetermined pressure ratio from said secondary fluid pressurizing chamber to its outlet above a predetermined pressure at said secondary pressurizing chamber outlet;

and a shuttle piston assembly reciprocably mounted in said secondary pressurizing piston bore and having opposed areas respectively responsive to fluid pressure generated in said primary and secondary fluid pressurizing chambers and acting upon a predetermined relative pressure loss in said primary fluid pressurizing chamber to move toward said primary fluid pressurizing chamber and open said proportioner assembly to render the same inoperative to proportion fluid pressure and to permit fluid pressure generated in said secondary fluid pressurizing chamber to be delivered to its outlet without being proportionally modified by said proportioner assembly.

2. In a master cylinder assembly having a housing with a bore therein:

a primary pressurizing piston and a secondary pressurizing piston reciprocably received in said housing bore and defining therewith a primary pressurizing chamber between said pistons, said secondary pressurizing piston cooperating with said bore to define first and second secondary pressurizing chambers on the opposite end of said secondary pressurizing piston from said primary pressurizing chamber, said primary pressurizing chamber having a first circuit outlet and said secondary pressurizing chamber having a second circuit outlet;

passage means in said secondary pressurizing piston providing fluid communication between said first and second secondary pressurizing chambers;

pressure proportioning means in said passage means, said proportioning means being open below a predetermined pressure level in said first and second secondary pressurizing chambers to maintain the same pressure therein, and being responsive to pressures in said first and second secondary pressurizing chambers to proportion pressure generated in said first secondary pressurizing chamber into said second secondary pressurizing chamber when the pressure in said second secondary pressurizing chamber is at and above the predetermined pressure level, said first secondary pressurizing chamber tending to generate pressure at a higher rate than said second secondary pressurizing chamber as said secondary piston is moved in the pressure generating direction in said housing bore;

and means in said secondary piston responsive to pressures generated in said primary and said first secondary pressurizing chambers and acting upon the loss of pressure only in said primary pressurizing chamber to render said pressure proportioning means inoperative to proportion as aforesaid whereby the pressure generated in said first secondary pressurizing chamber is delivered substantially undiminished through said passage means and said second secondary pressurizing chamber to said second circuit outlet.

3. A master cylinder assembly having in tandem in a stepped master cylinder bore a primary piston and a stepped secondary piston, primary pressurizing chamber means between said pistons, and secondary pressurizing chamber means formed by said stepped secondary piston and said stepped bore, said secondary pressurizing chamber means including a first chamber section of annular conformation with the outer diameter thereof being the same as the diameter of said primary pressurizing chamber and a second chamber section of reduced diameter defined by the reduced diameter stepped portions of said secondary piston and said stepped bore;

a proportioning valve assembly including a proportioning piston and a valve head and a valve seat received in a bore in said secondary piston with the opposed ends of said proportioning piston respectively sensing pressures in said first and second chamber sections and in one condition of operation permitting substantially unrestricted pressure flow between said first and second chamber sections and in another condition of operation proportionately reducing pressure flow from said first chamber section to said second chamber section;

and a shuttle piston reciprocably and sealingly mounted in the bore of said secondary piston with the opposed ends thereof respectively subjected to pressures in said primary pressurizing chamber means and said first chamber section of said secondary pressurizing chamber means, said shuttle piston having a proportioner stem thereon carrying said proportioning valve head, said shuttle piston acting upon loss of pressure only in said primary pressurizing chamber means to move said proportioner stem to open said proportioning valve assembly by removal of said proportioning valve head away from said valve seat sufficiently to permit full pressure flow from said first chamber section to said second chamber section of said secondary pressurizing chamber means.

4. In a master cylinder assembly having a fluid reservoir, tandemly arranged primary and secondary fluid pressurizing pistons in a housing bore and defining with said housing bore primary and secondary fluid pressurizing chamber means and fluid reservoir connected cavities, first pressurized passage means from said primary fluid pressurizing chamber means operatively connectable to vehicle front wheel brakes, and second pressurized fluid passage means from said secondary fluid pressurizing chamber means operatively connectable to vehicle rear wheel brakes, the improvement comprising:

said housing bore having a main bore section and a reduced diameter bore end section, said secondary piston having a main body section with spaced lands thereon and seals on said lands reciprocably sealing with said main bore section to define a fluid reservoir connected cavity therebetween, said secondary piston further having a reduced diameter extension sealingly and reciprocably received in said reduced diameter bore end section, the portion of said secondary fluid pressurizing chamber means formed about said extension and in said main bore section comprising a first portion of said secondary fluid pressurizing chamber means and said reduced diameter bore end section defining with said secondary piston reduced diameter extension a second portion of said secondary fluid pressurizing chamber means having said second pressurized fluid passage means connected therewith;

said secondary piston having a bore extending axially therethrough, said secondary piston bore having a first bore section and a second bore section separated by an apertured wall said first bore section being fluid connected to said first portion of said secondary fluid pressurizing chamber means by a passage in said secondary piston opening into said first bore section adjacent said apertured wall, said second bore section having a reduced diameter portion adjacent said apertured wall and a larger diameter portion opening into said housing bore reduced diameter bore end section, said larger diameter portion being fluid connected with said secondary piston fluid reservoir connected cavity by another passage in said secondary piston opening into said large diameter portion of said second bore section adjacent said reduced diameter portion of said second bore section;

a shuttle piston reciprocably mounted in said secondary piston first bore section having one end exposed to pressure in said primary fluid pressurizing chamber means and the other end exposed to pressure in said first portion of said secondary fluid pressurizing chamber means;

a proportioner stem in said first bore section having a valve end extending through said apertured wall and into said second bore section, said valve end being of sufficiently lesser diameter than the aperture of said apertured wall to permit substantially unrestricted fluid flow therethrough, said valve end terminating axially intermediate said apertured wall and the opening of said another passage into said second bore section, said stem further having the other end thereof connected with said shuttle piston by a limited movement lost motion connection and having means limiting movement of said proportioner stem in the direction toward said second bore section;

a proportioner piston having different diameter end lands provided with seals and reciprocably received in said second bore section with the larger diameter end land in said larger diameter portion and the smaller diameter end land in said reduced diameter portion of said second bore section to define between said end lands an annular chamber in fluid communication with said secondary piston fluid reservoir connected cavity through said another passage, said proportioner piston having a fluid passage extending axially therethrough with the end thereof opening into said reduced diameter portion of said second bore section forming a proportioner valve seat cooperable with said proportioner stem valve end in valving relation;

spring means in said proportioner piston annular chamber continually urging said proportioner piston toward a stop member in the end of said diameter portion of said second bore section opposite said reduced diameter portion of said second bore section;

and warning signal control means responsive to reciprocal movement of said shuttle piston in response to a predetermined decrease in one of the pressures acting on said shuttle piston ends relative to the other of the pressures so acting to energize a pressure loss warning signal, movement of said shuttle piston in response to such a pressure decrease in said primary fluid pressurizing chamber means relative to pressure in said first portion of said secondary fluid pressurizing chamber means moving said proportioner stem valve end away from and out of valving relation with said valve seat to permit the fluid pressure in said first portion of said secondary fluid pressurizing chamber means to be delivered substantially undiminished to said second portion of said secondary fluid pressurizing chamber means.

* * * * *

UNITED STATES PATENT AND TRADEMARK OFFICE
CERTIFICATE OF CORRECTION

PATENT NO. : 3,938,333
DATED : February 17, 1976
INVENTOR(S) : Thomas P. Mathues It is certified that error appears in the above-identified patent and that said Letters Patent are hereby corrected as shown below:

Column 2, line 4, "ia" should be is; line 20, after "includes" insert -- a --.
Column 3, line 2, "fith" should be with.

Column 11, line 8, "484" should be 482.
Column 12, line 27, "556" should be 566.
Column 13, line 64, after "by" insert -- the --.
Column 14, line 11, after "shuttlepiston" insert -- seal --; line 16, after "differential" insert -- between --; line 25, "caming" should be camming.
Column 15, (claim 1) line 24, after "secondary" insert -- fluid --; line 29, "pressure" should be pressures.
Column 15, (claim 2) line 51, after "said" insert -- second --.
Column 18, (claim 4) line 26, after "said" insert -- larger --.

Signed and Sealed this

Sixth Day of July 1976

[SEAL]

Attest:

RUTH C. MASON
Attesting Officer

C. MARSHALL DANN
Commissioner of Patents and Trademarks